United States Patent
Tsai

(10) Patent No.: US 6,174,254 B1
(45) Date of Patent: Jan. 16, 2001

(54) CONTINUOUSLY VARIABLE TRANSMISSION WITH CONTROL ARRANGEMENT AND FOR REDUCING TRANSMISSION BELT SLIPPAGE

(75) Inventor: Shan-Chin Tsai, Rockford, IL (US)

(73) Assignee: Hamilton Sundstrand Corporation, Rockford, IL (US)

( * ) Notice: Under 35 U.S.C. 154(b), the term of this patent shall be extended for 0 days.

(21) Appl. No.: 09/222,958

(22) Filed: Dec. 30, 1998

(51) Int. Cl.[7] .................................................. F16H 59/00
(52) U.S. Cl. ................................. 474/69; 474/28
(58) Field of Search .................... 474/11, 12, 17, 474/18, 28; 477/39, 44, 45, 46, 48; 62/228

(56) References Cited

U.S. PATENT DOCUMENTS

| | | |
|---|---|---|
| 4,152,947 | 5/1979 | van Deursen et al. . |
| 4,405,028 * | 9/1983 | Price ................................. 180/65 E |
| 4,462,275 | 7/1984 | Mohl et al. . |
| 4,500,301 | 2/1985 | Cadee . |
| 4,665,775 * | 5/1987 | Nagamatsu et al. ............... 474/12 X |
| 4,685,357 | 8/1987 | Sawada et al. . |
| 4,702,725 | 10/1987 | Kouno et al. . |
| 4,729,264 | 3/1988 | Sakai . |
| 4,730,522 | 3/1988 | Morimoto . |
| 4,734,082 | 3/1988 | Tezuka . |
| 4,743,223 * | 5/1988 | Tokoro et al. ...................... 474/28 X |
| 4,751,857 | 6/1988 | Sakai . |
| 4,771,658 | 9/1988 | Miyawaki . |
| 4,774,855 | 10/1988 | Murrell et al. . |
| 4,798,561 | 1/1989 | Hattori et al. . |
| 4,991,400 * | 2/1991 | Wilkinson ............................. 62/228 |
| 5,012,697 | 5/1991 | Yamashita et al. . |
| 5,279,523 | 1/1994 | Schönnenbeck . |
| 5,649,876 | 7/1997 | Morishita . |
| 5,720,692 * | 2/1998 | Kashiwabara ........................... 477/45 |
| 5,725,447 | 3/1998 | Friedmann et al. . |
| 5,871,411 * | 2/1999 | Senger et al. .......................... 474/11 |

FOREIGN PATENT DOCUMENTS

635639 * 1/1995 (EP) .

* cited by examiner

Primary Examiner—Thomas R. Hannon
Assistant Examiner—Marcus Charles
(74) Attorney, Agent, or Firm—Antonelli, Terry, Stout & Kraus, LLP

(57) ABSTRACT

A continuously variable transmission, and particularly a control arrangement thereof and a method for reducing belt slippage in the transmission, are disclosed. A single source of constant hydraulic pressure is operatively connected for driving each of the hydraulically operated actuators for axially movable sheaves of primary and secondary pulleys of the transmission. A hydraulic pressure control loop controls the hydraulic pressure applied to the actuator of the secondary pulley as a function of the sensed load of the device being driven on the transmission and the pitch radius of the secondary pulley. An output speed control loop controls the output speed of the transmission driving the device to be driven. Preferably, the output speed control loop may be set to control the output speed at a constant value for driving an aircraft electric generator. The control arrangement and method are simpler and more robust than previous control arrangements and methods.

18 Claims, 3 Drawing Sheets

CONTINUOUSLY VARIABLE TRANSMISSION WITH CONTROL ARRANGEMENT AND FOR REDUCING TRANSMISSION BELT SLIPPAGE

FIELD OF THE INVENTION

The present invention is directed to a continuously variable transmission and, more particularly, to a control arrangement thereof and a method for reducing belt slippage in the transmission. In a disclosed preferred embodiment, the transmission is used as a constant speed drive for an aircraft electrical power generator.

BACKGROUND AND SUMMARY OF THE INVENTION

The variable pulley transmission, or continuously variable transmission (CVT) as it is commonly called, has been under development for over two decades, but its use as a power transmission is mainly for automotive applications. Its control is rather complicated and is very sensitive to operating conditions. For example, in a control arrangement for a variable pulley transmission disclosed in U.S. Pat. No. 4,458,318, a variable line pressure is controlled and applied to the sheave of the secondary or driven pulley of the transmission, and also serves as the hydraulic power supply to a ratio control valve in a speed control loop of the transmission.

Applicant has found that due to the variable supply pressure in the continuously variable transmission of U.S. Pat. No. 4,458,318, both the pressure control valve (a pressure relief type valve) and the ratio control valve gains change with the supply pressure, and the control is therefore very sensitive to system operating conditions. There is a need for an improved continuously variable transmission with a control arrangement and method for reduction of belt slippage in a continuously variable transmission which overcome these drawbacks and disadvantages of this known continuously variable transmission. More particularly, there is a need for an improved continuously variable transmission with a control arrangement and method which are simpler and more robust than those disclosed in U.S. Pat. No. 4,458,318. It is an object of the present invention to provide a continuously variable transmission with a control arrangement and method which meet this need.

Another object of the present invention is to provide a continuously variable transmission with a control arrangement and method for use as a constant speed drive for an aircraft electrical power generator wherein belt slippage can be minimized.

These and other objects are attained by the continuously variable transmission of the present invention for transferring drive from an engine to a device to be driven wherein the transmission comprises a primary pulley for receiving drive from an engine, a belt, a secondary pulley which is coupled over the belt to the primary pulley for transferring drive to a device to be driven, each of the primary and secondary pulleys having an axially movable sheave and a hydraulically operated actuator therefor to effect ratio change of the transmission and to maintain belt tension, and wherein a single source of constant hydraulic pressure is operatively connected for driving the actuators. In the disclosed form of the invention, the source of constant hydraulic pressure comprises a hydraulic pump and a pressure relief valve in communication with the output of the hydraulic pump to maintain a constant predetermined hydraulic output pressure of the pump. The single source of constant hydraulic pressure is operatively connected to the actuator of the primary pulley by way of a ratio control valve and to the actuator of the secondary pulley by way of a pressure control valve.

According to further features of the invention, the continuously variable transmission includes a hydraulic pressure control loop for controlling the hydraulic pressure applied to the actuator of the secondary pulley as a function of the sensed load of the device to be driven on the transmission and the pitch radius of the secondary pulley. An output speed control loop is also provided for controlling the output speed of the transmission driving the device to be driven. In the disclosed embodiment the output speed control loop may be set to control the output speed at a constant value for driving an aircraft electric generator. According to another feature of the invention, the hydraulic pressure control loop measures the speed of the generator and the load current of the generator being driven for calculation of the load torque of the generator on the transmission.

A method of the invention for reducing belt slippage in the continuously variable transmission comprises determining the hydraulic pressure to be applied by the hydraulic pressure control loop to the actuator of the secondary pulley to keep the belt from slipping. This determining is accomplished according to the disclosed embodiment by determining the load torque transmitted from the device to be driven to the secondary pulley of the transmission and the pitch radius of the secondary pulley; and calculating a value for the set pressure to be applied by the hydraulic pressure control loop to the actuator of the secondary pulley in accordance with a relationship disclosed hereinafter utilizing the determined load torque and pitch radius of the secondary pulley together with the coefficient of friction between the belt and the secondary pulley and the area of the actuator for the axially movable sheave of the secondary pulley. The calculated value for the set pressure is preferably multiplied by a factor slightly greater than 1, such as 1.2, to determine a set pressure of the hydraulic pressure control loop to be applied to the actuator of the secondary pulley with some margin for safety against belt slippage while guarding against use of too large a pressure which would shorten the life of the belt and pulleys.

These and other objects, features and advantages of the present invention will become more apparent from the following detailed description of the invention taken with the accompanying drawings depicting a preferred embodiment in accordance with the invention.

DETAILED DESCRIPTION OF THE DISCLOSED EMBODIMENT

Figure 1:
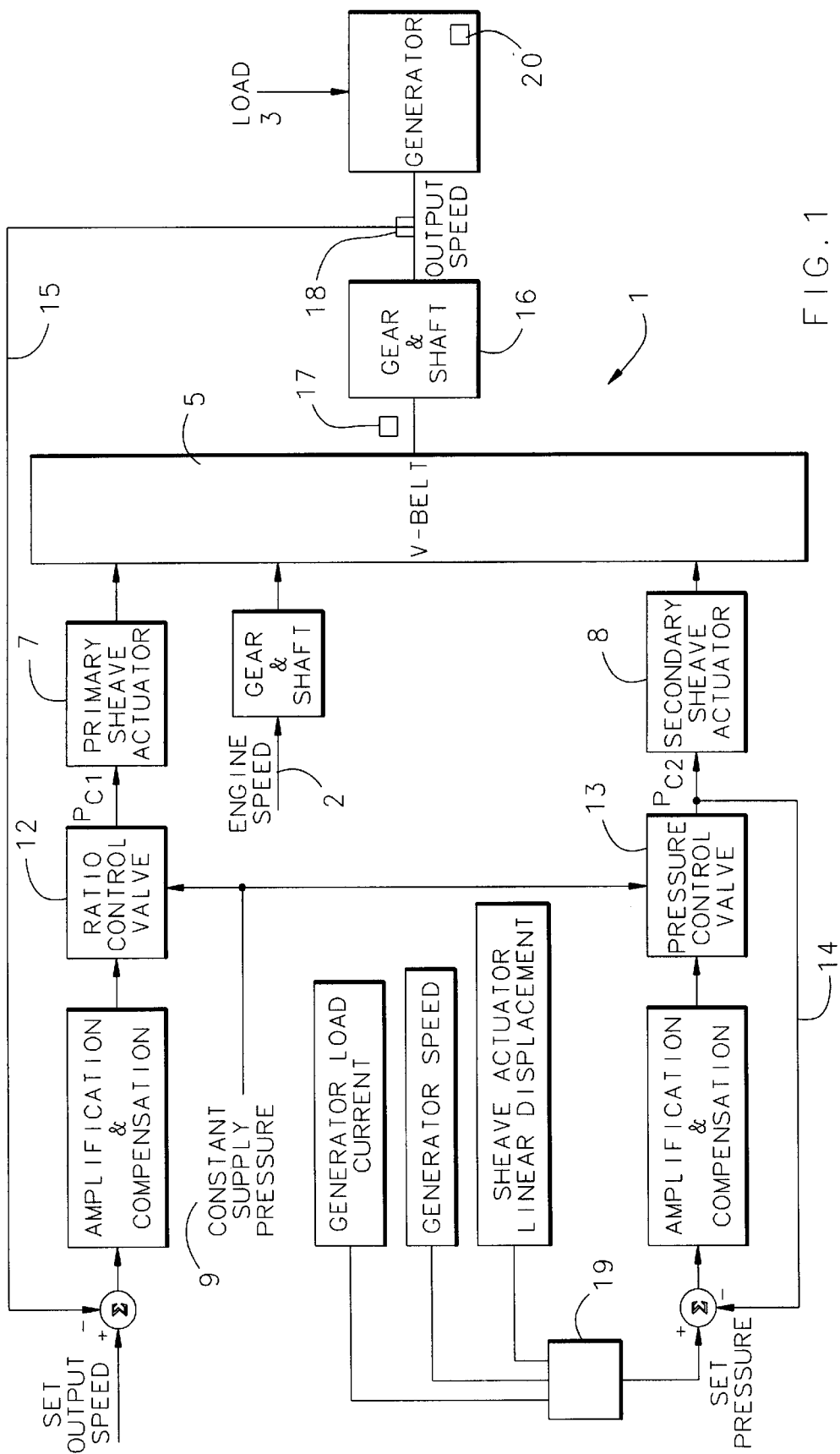
FIG. 1 is a schematic illustration of a continuously variable transmission of the invention including the control arrangement thereof for a variable pulley transmission used as a constant speed drive for an aircraft electric generator.

Referring now to the drawings, FIG. 1 depicts a continuously variable transmission 1 of the invention for transferring drive from an engine 2 to a device 3 to be driven. The transmission 1 comprises a primary pulley 4, shown schematically in FIG. 2, receiving drive from the engine, a belt 5 and a secondary pulley 6 which is coupled over the belt to the primary pulley 4 for transferring drive to the device 3. The primary and secondary pulleys each have a fixed sheave, 22 and 22' respectively and an axially movable sheave, 23 and 23' respectively. The positions of the axially movable sheaves are adjustable by respective hydraulically operated actuators 7 and 8 to effect ratio change in the transmission and to maintain belt tension. A single source 9 of constant hydraulic pressure is operatively connected for driving each of the actuators 7 and 8.

Figure 2:
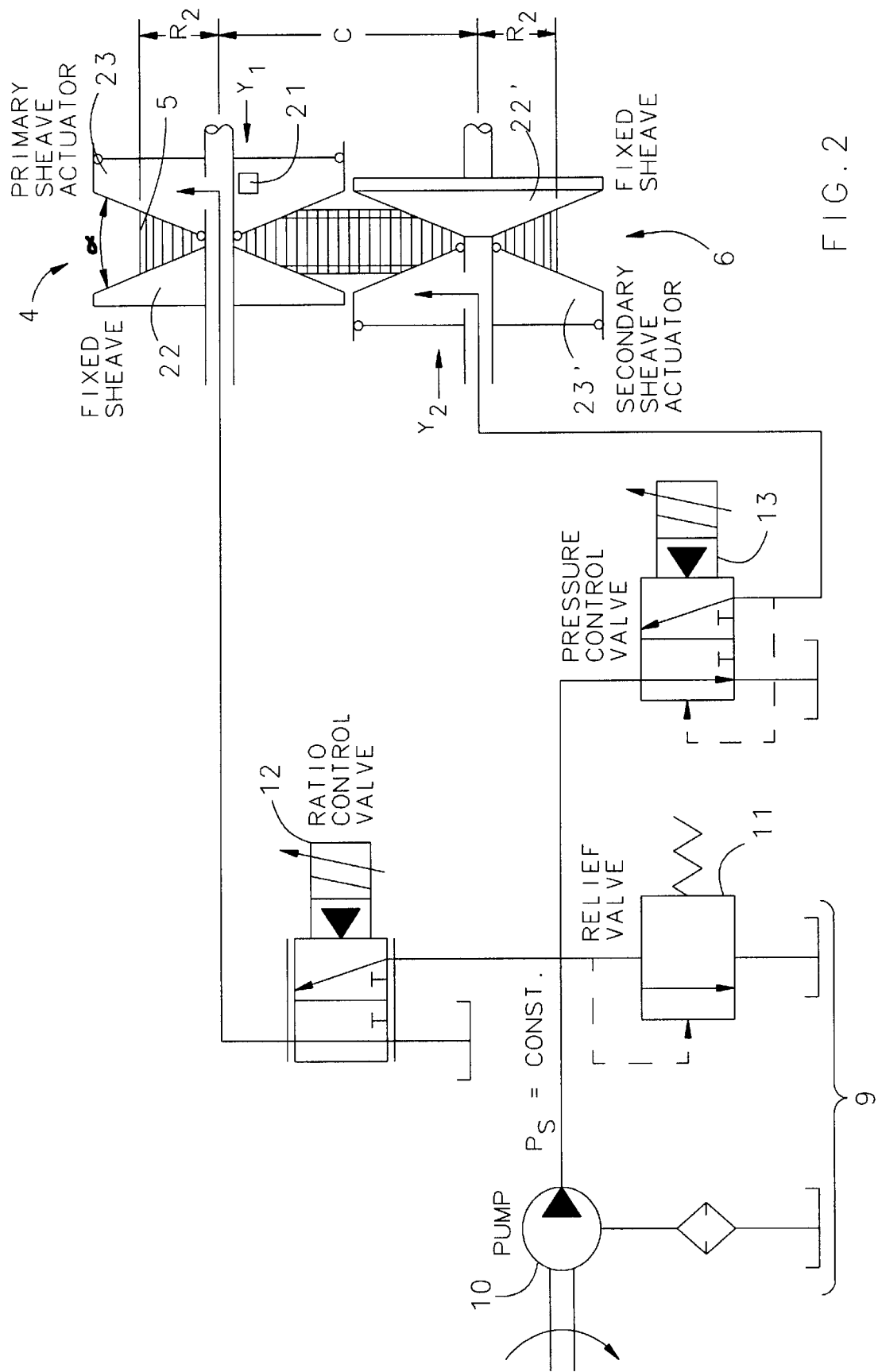
FIG. 2 is a schematic drawing of the continuously variable transmission hydraulic system of the embodiment of FIG. 1.

In the disclosed embodiment, as illustrated in FIG. 2, the source of constant hydraulic pressure 9 comprises a hydraulic pump 10 and a pressure relief valve 11 in communication with the output of the hydraulic pump to maintain a constant predetermined hydraulic output pressure Ps of the pump as denoted in FIGS. 1 and 2. The single source of constant hydraulic pressure is operatively connected to the primary sheave actuator 7 by way of a ratio control valve 12. The ratio control valve may be a two-stage three-way servovalve of the type disclosed in U.S. Pat. No. 4,458,318, for example. The constant supply pressure 9 is operatively connected to the secondary sheave actuator 8 by way of a pressure control valve 13. The valve 13 is a pressure reducing type valve, preferably an electrohydraulic pressure reducing valve such as an electrically driven proportioning solenoid valve. Reference is made to the co-pending, commonly assigned U.S. patent application Ser. No. 09/222,955 for PRESSURE REDUCING VALVE AND CONTINUOUSLY VARIABLE TRANSMISSION WITH CONTROL ARRANGEMENT USING SAME filed concurrently with this application and hereby incorporated by reference, for a detailed disclosure of a preferred form of the pressure reducing valve although other pressure reducing valves may be used.

For a continuously variable transmission to work properly, it has to be controlled such that, firstly, enough force is applied to the secondary sheave, the driven sheave, to keep the belt from slipping, and secondly, a variable force must be applied to the primary sheave, the driver sheave, to change the transmission ratio according to the requirement of system operation. In the disclosed embodiment, the requirement of system operation is for constant speed drive application for driving device 3, which is an aircraft electrical generator, whereby the transmission output speed must be maintained constant. The electronic-hydraulic control system of the continuously variable transmission 1 in the disclosed embodiment is used to control the above-mentioned two functions.

The control system consists of two main control loops: a pressure control loop 14 to control the force applied to the secondary sheave by actuator 8 for controlling belt tension, and an output speed control loop 15 for controlling the transmission ratio to maintain the transmission output speed, namely the output shaft speed of the secondary pulley 6, at a constant value under varying engine speed and generator load conditions. This control arrangement of the transmission 1 is simpler and more robust than the previous arrangement in U.S. Pat. No. 4,458,318. Without the constant supply pressure source 9 of the invention, a complicated gain scheduling scheme will be required to compensate for changes in supply pressure that cause belt slippage in the conventional continuously variable transmission.

The force required to be applied to the axially movable sheave of the secondary pulley by actuator 8 to keep the belt 3 from slipping is a function of load torque and the pulley pitch radius. A method of the invention for reducing belt slippage in the continuously variable transmission comprises determining the hydraulic pressure to be applied to the actuator 8 of the secondary pulley to keep the belt from slipping. This determining step includes determining the load torque $TQ_O$ transmitted from the device to be driven to the secondary pulley of the transmission and the pitch radius $r_2$ of the secondary pulley, and calculating a value for the set pressure Pset of the hydraulic pressure control loop to be applied to the actuator 8 of the secondary pulley 6 in accordance with the relationship $$Pset = \left(\frac{TQ_o}{r_2} \cdot \frac{\cos(\alpha/2)}{2\mu}\right) / As$$

where:

| | |
|---|---|
| $TQ_o$ | is the torque on the secondary pulley from the device to be driven |
| $r_2$ | is the secondary pulley pitch radius, |
| $\alpha$ | is the pulley groove angle, |
| $\mu$ | is the coefficient of friction between the belt and the secondary pulley, and |
| As | is the area of the actuator for the sheave of the secondary pulley. |

The step of determining the load torque transmitted from the generator 3 to the secondary pulley of the continuously variable pulley transmission 1 according to the invention includes measuring the generator load current $I_L$ with current detector 20, the generator speed $N_G$ with speed sensor 18 and the linear displacement $Y_1$ of the primary sheave actuator 7 using detector 21. From the geometry of the primary pulley 4, its pitch radius of $r_1$ is calculated from the measured sheave actuator displacement $Y_1$. The generator torque $TQ_G$ is calculated given the measurements of $I_L$, $N_G$, and $Y_1$ as set forth below. From the constraint of constant belt length of belt 5 and constant C distance between the centers of the two pulleys 4 and 6, the pitch radius $r_2$ of the driven pulley 6 is then calculated using the now known pitch radius $r_1$. Alternatively, the pitch radius $r_2$ could be directly measured using a proximity sensor, for example.

Figure 3:
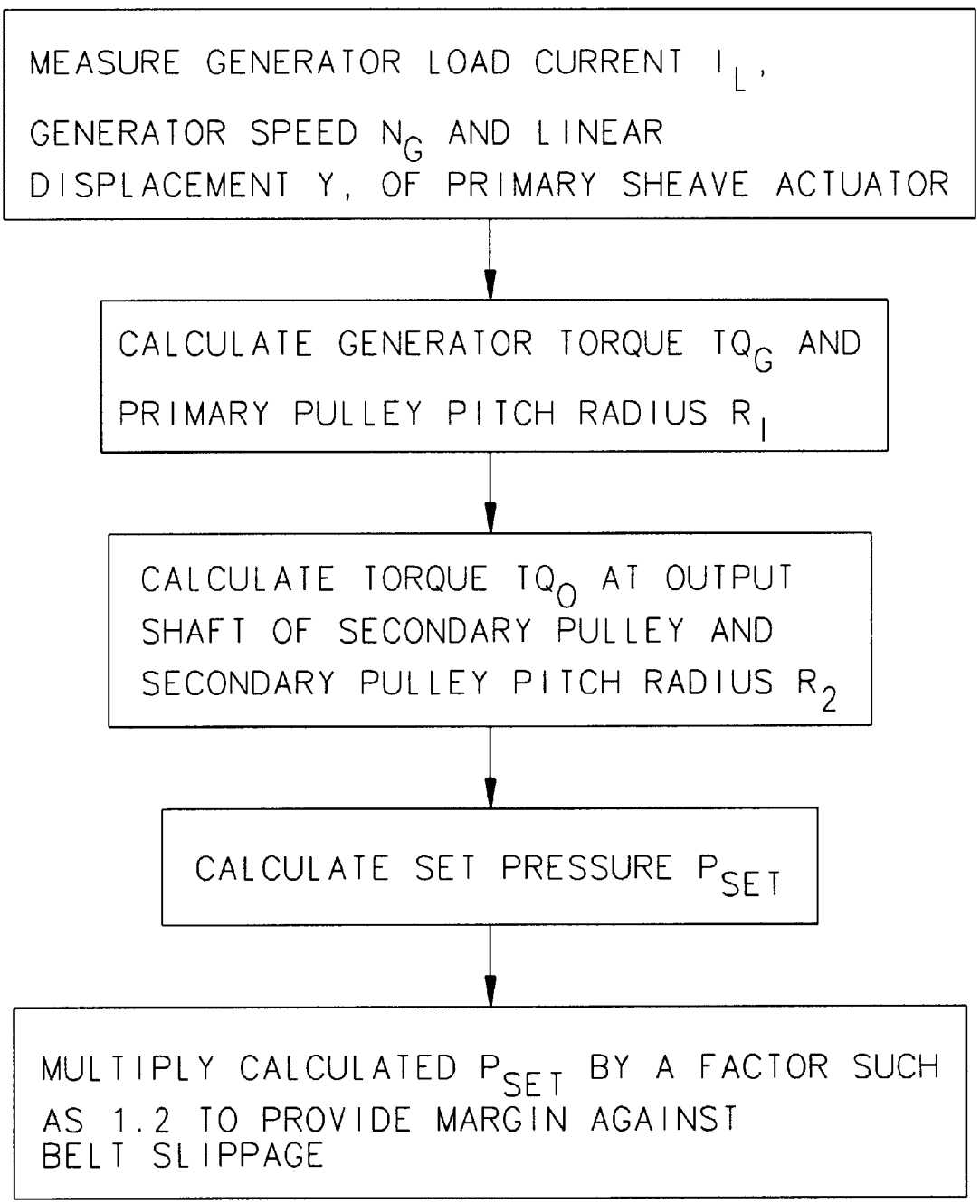
FIG. 3 is a flow chart of steps of a method according to the invention for calculating and applying the appropriate pressure to the actuator of the axially movable sheave of the secondary pulley of the continuously variable transmission of the invention.

The torque $TQ_O$ at the output shaft of the secondary pulley 6 of the transmission 1 is then calculated as set forth below using the previously calculated generator torque $TQ_G$ and the generator side gear ratio $R_{GO}$ of the gear and shaft unit 16 drivingly connected between the output shaft of the transmission and the generator 3 as depicted in FIG. 1. Using these values, the hydraulic pressure required, $P_{set}$, which serves as the command signal from calculating unit or microprocesor 19 to the pressure control loop 14, is obtained from the calculated force divided by the secondary sheave actuator area $A_S$. The procedure for calculating the set pressure $P_{set}$ for control loop 14 is set forth in the flow diagram of FIG. 3 and described in more detail below.

For sensing the load of the generator on the transmission, in addition to or instead of measuring the generator load current $I_L$, a torque sensor 17 mounted on the output shaft of the secondary pulley of the transmission can also be used. This provides an even more direct measurement of the load. Further, instead of measuring the linear displacement of the primary sheave, the displacement of the actuator of the secondary sheave can be measured for determining the pitch radius $r_2$, but there is no need to measure the displacement of both sheaves. To provide some safety margin, the calculated pressure $P_{set}$ is preferably multiplied by a factor of, for example, 1.2 to guard against belt slippage while avoiding undue force on the belt which would shorten the life of the belt and the pulleys.

Calculation of the set pressure $P_{set}$ is accomplished by the suitably programmed microprocessor of 19, given the measurements of $I_L$, $N_G$ and $Y_1$ and proceeds as follows:

$$Power = 3 \times 115 \times I_L$$

$$TQ_G = \frac{8.8507 \text{ Power}}{N_G (\pi/30)}$$

$$TQ_O = TQ_G / R_{GO}$$

$$r_1 = \frac{Y_1}{2 \tan(\alpha/2)}$$

where:

$$r_2 = \frac{-(\pi c - 2r_1) + \sqrt{(\pi c - 2r_1)^2 + 4(LC - 2c^2 - \pi r_1 c - r_1^2)}}{2}$$

$$P_{set} = \left(\frac{TQ_o}{r_2} \frac{\cos(\alpha/2)}{2\mu}\right) / A_s$$

$A_S$—secondary sheave actuator area, in$^2$
$\alpha$—pulley groove angle, deg
C—pulley center distance, in
L—belt length, in
$N_G$—generator speed, rpm
$r_1$—primary pulley pitch radius, in
$r_2$—secondary pulley pitch radius, in
$R_{GO}$—generator side gear ratio
$P_{set}$—pressure of the pressure control loop
$TQ_g$—generator torque, in-lbs
$TQ_O$—torque at secondary sheave shaft, in-lbs
$Y_1$—primary sheave actuator linear displacement, in
$\mu$—coefficient of friction In the speed control loop 15, the set speed command signal is a constant, depending on the number of poles of the generator used and, for example, is selected to give a 400 cps revolution at the generator shaft in the case of a two pole generator, or a 200 cps revolution in the case of a four pole machine. The generator speed is measured by a sensor 18, FIG. 1, and compared with the set output speed command. The sensor 18 also provides a generator speed signal to calculating unit 19. The unbalanced forces applied on the primary and secondary sheaves causes the continuously variable transmission ratio to change. Given a force applied on the secondary sheave, the speed control loop 15 will automatically adjust the force applied on the primary sheave to change the transmission ratio by way of ratio control valve 12 to match the generator speed to the speed command.

While only a preferred embodiment of the invention has been disclosed herein, it is apparent that various modifications and alterations of the invention may be made. It is therefore the intention in the appended claims to cover all such modifications and alterations as may fall within the spirit and scope of the invention.

I claim:

1. A continuously variable transmission for transferring drive from an engine to a device to be driven, said transmission comprising a primary pulley for receiving drive from an engine, a belt, a secondary pulley which is coupled over said belt to the primary pulley for transferring drive to a device to be driven, said primary and secondary pulleys each having an axially movable sheave and a hydraulically operated actuator therefor to effect ratio change of the transmission and to maintain belt tension, a hydraulic pressure control loop for controlling the hydraulic pressure applied to the actuator of said secondary pulley as a function of the sensed load of said device to be driven on said transmission and the pitch radius of the secondary pulley, and an output speed control loop for controlling the output speed of said transmission driving said device to be driven.

2. The transmission according to claim 1, wherein said hydraulic pressure control loop includes a hydraulic pressure control valve operatively connected between a source of hydraulic pressure and said actuator of said secondary pulley.

3. The transmission according to claim 1, wherein said output speed control loop includes a ratio control valve operatively connected between a source of hydraulic pressure and said actuator of said primary pulley.

4. The transmission according to claim 1, further comprising a single source of constant hydraulic pressure operatively connected for driving each of said actuators, said source of constant hydraulic pressure comprising a hydraulic pump and a pressure relief valve in communication with the output of said hydraulic pump to maintain a predetermined hydraulic output pressure of the pump.

5. The transmission according to claim 1, wherein said output speed control loop is set to control said output speed at a constant value.

6. The transmission according to claim 1, in combination with an electric generator as said device to be driven.

7. The transmission according to claim 6, wherein said hydraulic pressure control loop measures the speed of the generator and the load current of said generator for calculation of a load torque of said generator on said transmission.

8. The transmission according to claim 1, wherein said hydraulic pressure control loop measures a load torque on an output shaft of said secondary pulley driving said device to be driven.

9. A continuously variable transmission for use as a constant speed drive, comprising a primary pulley for receiving drive from an engine, a belt, a secondary pulley which is coupled over said belt to the primary pulley for transferring drive to a device to be driven, the primary and secondary pulleys each having an axially movable sheave and a hydraulically operated actuator therefor to effect ratio change of the transmission and to maintain belt tension, a single source of constant hydraulic pressure for driving each of said actuators, a ratio control valve operatively connected between said single source of constant hydraulic pressure and the actuator of said primary pulley, a pressure control valve operatively connected between said single source of constant hydraulic pressure and the actuator of said secondary pulley, an output speed control loop which is set to control the output speed of the transmission at a constant value by way of said ratio control valve, and a hydraulic pressure control loop for controlling the hydraulic pressure applied to the actuator of said secondary pulley by way of said pressure control valve as a function of the sensed load of said device to be driven on the transmission and the pitch radius of the secondary pulley.

10. The transmission according to claim 9, wherein said source of constant hydraulic pressure comprises a hydraulic pump and a pressure relief valve in communication with the output of said hydraulic pump to maintain a constant predetermined hydraulic output pressure of the pump.

11. The transmissions according to claim 9, in combination with an electric generator as said device to be driven.

12. The transmission according to claim 11, wherein said hydraulic pressure control loop measures the speed of the generator and the load current of said generator for calculation of a load torque of said generator on said transmission.

13. The transmission according to claim 9, wherein said hydraulic pressure control loop measures a load torque on an output shaft of said secondary pulley driving said device to be driven.

14. A method for reducing belt slippage in a continuously variable transmission for transferring drive from an engine to a device to be driven, said transmission comprising a primary pulley for receiving drive from an engine, a belt, a secondary pulley which is coupled over said belt to the primary pulley for transferring drive to a device to be driven, said primary and secondary pulleys each having an axially movable sheave and a hydraulically operated actuator thereof or to effect ratio change of the transmission and to maintain belt tension, a hydraulic pressure control loop for controlling the hydraulic pressure applied to the actuator of said second pulley as a function of the load of said device to be driven on said transmission and the pitch radius of said secondary pulley, and an output speed control loop to control the output speed of said transmission for driving said device to be driven at a constant value, said method comprising determining the hydraulic pressure to be applied by said hydraulic pressure control loop to the actuator of said secondary pulley to keep the belt from slipping, by the steps including:

determining the load torque transmitted from the device to be driven to the secondary pulley of the transmission and the pitch radius of the secondary pulley; and calculating a value Pset for the set pressure of the hydraulic pressure control loop to be applied to the actuator of the secondary pulley in accordance with the relationship $$Pset = \left( \frac{TQ_o}{r_2} \cdot \frac{\cos(\alpha/2)}{2\mu} \right) / As$$

where:

| | |
|---|---|
| $TQ_o$ | is the torque on the secondary pulley from the device to be driven |
| $r_2$ | is the secondary pulley pitch radius |
| $\alpha$ | is the pulley groove angle |
| $\mu$ | is the coefficient of friction between the belt and the secondary pulley |
| $As$ | is the area of the actuator for the sheave of the secondary pulley. |

15. The method according to claim 14, further comprising multiplying said calculated value for the set pressure $P_{set}$ by a factor slightly greater than 1, such as 1.2, to determine the set pressure of the hydraulic pressure control loop to be applied to the actuator of said second pulley with some margin for safety against belt slippage while guarding against use of too a large pressure which would shorten the life of the belt and the pulleys.

16. The method according to claim 14, wherein said device to be driven is an electric generator and said step of determining the load torque transmitted from the device to be driven to the secondary pulley includes measuring the speed of the generator and the generator load current and calculating the torque transmitted from the generator to the secondary pulley.

17. The method according to claim 14, wherein said step of determining the load torque includes providing a torque sensor on an output shaft of the secondary pulley for sensing the torque transmitted from the device to be driven to the secondary pulley.

18. The method according to claim 14, wherein said step of determining the pitch radius of the secondary pulley includes measurement of the linear displacement of the sheave of one of said primary and secondary pulleys, and from the geometry of the primary and secondary pulleys and the constraints of a constant belt length and a constant center distance of the two pulleys, calculating the pitch radius of the secondary pulley.

* * * * *